(12) United States Patent
Martin et al.

(10) Patent No.: US 8,522,104 B2
(45) Date of Patent: Aug. 27, 2013

(54) SMART AGING RETRY BUFFER

(75) Inventors: Philippe Martin, La Colle sur Loup (FR); Luc Montperrus, Montigny-Le-Bretonneux (FR)

(73) Assignee: Arteris S.A., Guyancourt (FR)

( * ) Notice: Subject to any disclaimer, the term of this patent is extended or adjusted under 35 U.S.C. 154(b) by 0 days.

(21) Appl. No.: 13/304,153

(22) Filed: Nov. 23, 2011

(65) Prior Publication Data
US 2012/0192024 A1    Jul. 26, 2012

Related U.S. Application Data

(60) Provisional application No. 61/417,136, filed on Nov. 24, 2010.

(51) Int. Cl.
*H04L 1/18* (2006.01)
*H03M 13/00* (2006.01)
*H04B 3/46* (2006.01)

(52) U.S. Cl.
USPC ............ 714/748; 714/749; 714/821; 375/228

(58) Field of Classification Search
USPC .......................... 714/748, 749, 821; 375/228
See application file for complete search history.

(56) References Cited

U.S. PATENT DOCUMENTS

| | | | |
|---|---|---|---|
| 5,771,356 A | 6/1998 | Leger et al. | |
| 6,014,706 A * | 1/2000 | Cannon et al. | 709/231 |
| 6,754,715 B1 * | 6/2004 | Cannon et al. | 709/231 |
| 7,099,300 B2 * | 8/2006 | Sugaya | 370/349 |
| 7,313,712 B2 * | 12/2007 | Cherukuri et al. | 713/324 |
| 7,320,080 B2 * | 1/2008 | Solomon et al. | 713/320 |
| 7,324,511 B2 * | 1/2008 | Nishihara | 370/389 |
| 7,610,500 B2 * | 10/2009 | Cherukuri et al. | 713/320 |
| 7,631,239 B2 * | 12/2009 | Yeo et al. | 714/748 |
| 7,673,038 B2 * | 3/2010 | Alvisi et al. | 709/224 |
| 7,752,473 B1 * | 7/2010 | Kwa et al. | 713/323 |
| 7,793,030 B2 * | 9/2010 | Jenkins et al. | 710/307 |
| 7,843,830 B1 * | 11/2010 | Subramanian et al. | 370/235 |
| 8,098,636 B2 * | 1/2012 | Sugaya | 370/337 |
| 8,214,708 B2 * | 7/2012 | Takaku | 714/748 |
| 2005/0036546 A1 * | 2/2005 | Rey et al. | 375/240.12 |
| 2006/0203760 A1 * | 9/2006 | Fukui et al. | 370/328 |
| 2006/0251079 A1 * | 11/2006 | Kwak et al. | 370/394 |

(Continued)

FOREIGN PATENT DOCUMENTS
EP       1 385 292       1/2004

OTHER PUBLICATIONS

International Search Report and Written Opinion of the International Searching Authority, PCT Application Serial No. PCT/IB2011/003095, Jul. 11, 2012, 9 pp.

*Primary Examiner* — John J Tabone, Jr.
(74) *Attorney, Agent, or Firm* — Fish & Richardson P.C.

(57) ABSTRACT

A method and controller for sending data frames over a lossy bidirectional link between integrated circuit chips is disclosed. Upon transmission, frames are stored in a buffer. The detection of errors is indicated and triggers retransmission of the erroneously received frame, but acknowledgement of correctly received frames is not indicated. Instead, the sending controller assumes that frames were correctly received if no error indication is received after a period of time. The period of time is the maximum amount of time that would be taken for the sending controller to receive an error indication if the frame was received with an error. After said period of time, the sent frame is discarded from the buffer.

11 Claims, 5 Drawing Sheets

(56) References Cited

U.S. PATENT DOCUMENTS

| | | | |
|---|---|---|---|
| 2007/0230390 A1* | 10/2007 | Takatani et al. | 370/315 |
| 2008/0075107 A1* | 3/2008 | Cherukuri et al. | 370/447 |
| 2008/0077814 A1* | 3/2008 | Cherukuri et al. | 713/320 |
| 2012/0002645 A1* | 1/2012 | Sugaya | 370/336 |

* cited by examiner

SMART AGING RETRY BUFFER

CROSS-REFERENCE TO RELATED APPLICATIONS

This application claims priority to U.S. Provisional Application Ser. No. 61/417,136, entitled "Smart Aging Retry Buffer," filed on Nov. 24, 2010, the entire contents of which are incorporated herein by reference.

TECHNICAL FIELD

This disclosure relates generally to integrated circuit technology for transmitting and receiving data in network, such as a network-on-chip (NoC).

BACKGROUND

Some systems require a reliable and low latency bidirectional data link between chips. For example, such links are useful in systems of multiple processors in multiple chips where a processor in one chip accesses a memory interface of the other chip through a dedicated link between the processor chips. Such systems occur in, for example, a mobile phone in which a modem processor chip and an applications processor chip connect using the Mobile Industry Processor Interface Low Latency Interface (MIPI LLI) protocol to share a double data rate dynamic (DDR) random access memory (RAM). The chips may be integrated circuits in different packages or integrated circuits inside the same package. They may also be implemented in multiple integrated circuits.

In such systems a multi layer protocol is used. A data link layer assumes the error free transmission of data from sender to receiver. The data link layer sends discrete amounts of data referred to as frames. A physical (PHY) layer is below the data link layer. The PHY layer sends the frame as well as control information. The physical link is assumed to be lossy, and the PHY layer is responsible for providing error free transmission of frames. Such systems implement an error detection algorithm in the receiver, and indicate errors to the sender. Upon the receiving an indication of an error, the sender retransmits frames from a buffer called a retry buffer.

The protocol is implemented by a controller within each chip, such as controller 100 shown in FIG. 1. Controller 100 includes retry buffer 10 coupled to transmitter 104. Transmitter 104 is configured to transmit frames across link 106 and controller 100 stores the sent frames in retry buffer 102. Signals 110, 108 referred to as ACK and NACK, respectively, are received from a receiving controller (not shown) on the other side of link 106 to indicate, respectively, complete error-free reception and a detected transmission error.

The receiving chip performs error detection on the frame that is received. The method of error detection could be a parity check on symbols, running disparity errors, badly formed frame detection, frame cyclic redundancy check (CRC) errors and sequence errors, or other error detection methods. The receiving chip gives an indication of ACK 110 for every frame or group of frames received free of errors. The receiving chip gives an indication of NACK 108 for every frame or group of frames received with an error.

When controller 100 gets an ACK 110 indication it discards the corresponding frame from retry buffer 102. When controller 100 gets a NACK 108 indication it takes from retry 102 buffer at least the frame that was received in error and retransmits it from transmitter 100 on link 106. Peripheral Component Interconnect Express (PCI Express) is such a example protocol, using both ACKs and NACKs in-band, in addition to a timeout on the reception of ACKs as an additional source of error detection.

One problem with such state of the art protocols is that either the ACK indication takes extra pins between chips or it is in-band and consumes extra bandwidth. What is needed is a smarter retry buffer management protocol and controller that does not require ACK signaling.

SUMMARY

The disclosed invention is a high-throughput controller with a smarter retry buffer and a protocol (method) that transmits NACKs in-band and that ages frames for a variable amount of time before discarding each from the retry buffer. The disclosed smarter retry buffer protocol and controller uses the state of the receive channel of the link to choose the aging period of frames in the buffer.

The high-throughput controller with smarter retry buffer is an efficient way to improve the size and speed of a retry buffer for transmission over a bidirectional lossy link using an aging-based protocol that does not provide reception acknowledgements.

DETAILED DESCRIPTION

Figure 1:
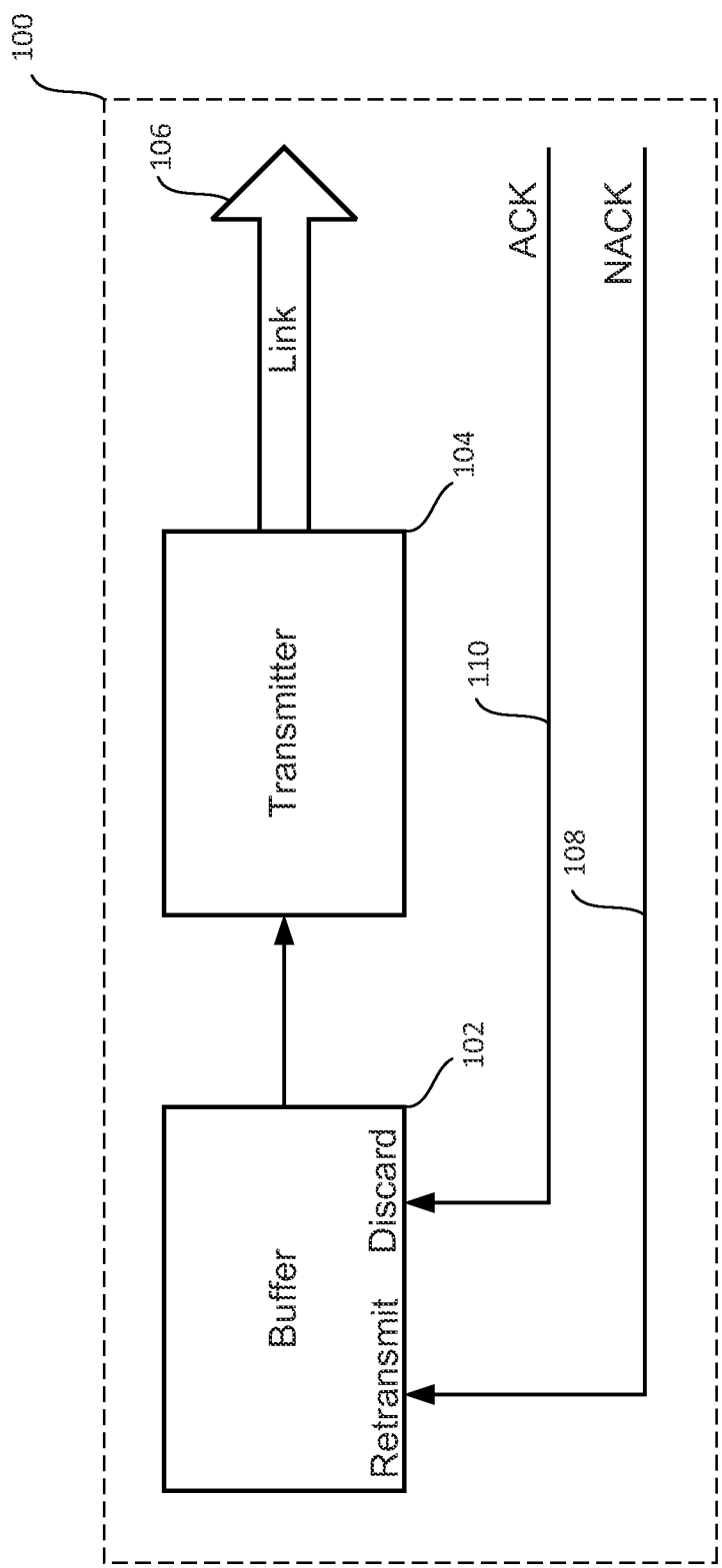
FIG. 1 is simplified block diagram of a controller with a retry buffer.
Figure 2:
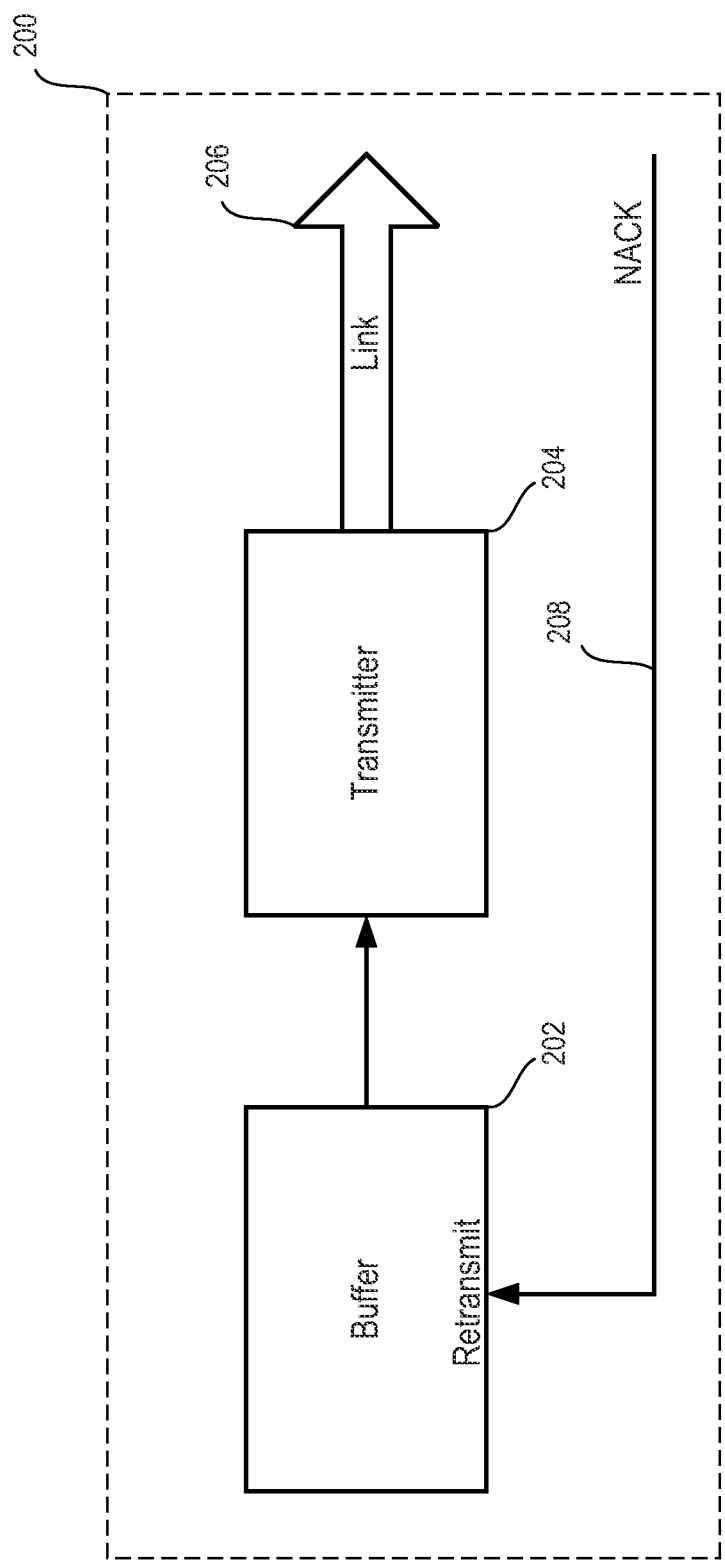
FIG. 2 is a simplified block diagram of a controller with an aging retry buffer.

In some embodiments, when an error has been detected by the receiving controller, NACK is indicated to the sending controller so that the erroneous frame is retransmitted. ACK is never indicated. In contrast to FIG. 1, FIG. 2 is a simplified block diagram of a sending controller 200 with no ACK indication. Without ACK, sending controller 200 safely assumes that after a certain period of time the previously transmitted frame was received without an error. The period of time is the maximum time that could be taken for sending controller 200 to get an error indication 208 (NACK) from the receiving controller (not shown) if an error occurred. After such time, buffer 202 safely discards the frame. Such a NACK protocol depends on the roundtrip time (RTT) between the transmission of a frame from the sending controller to the receiving controller and the possible reception of a corresponding NACK 208 at sending controller 200 from the receiving controller being bounded. This is known as a "timeout" or "aging" protocol.

Figure 3:
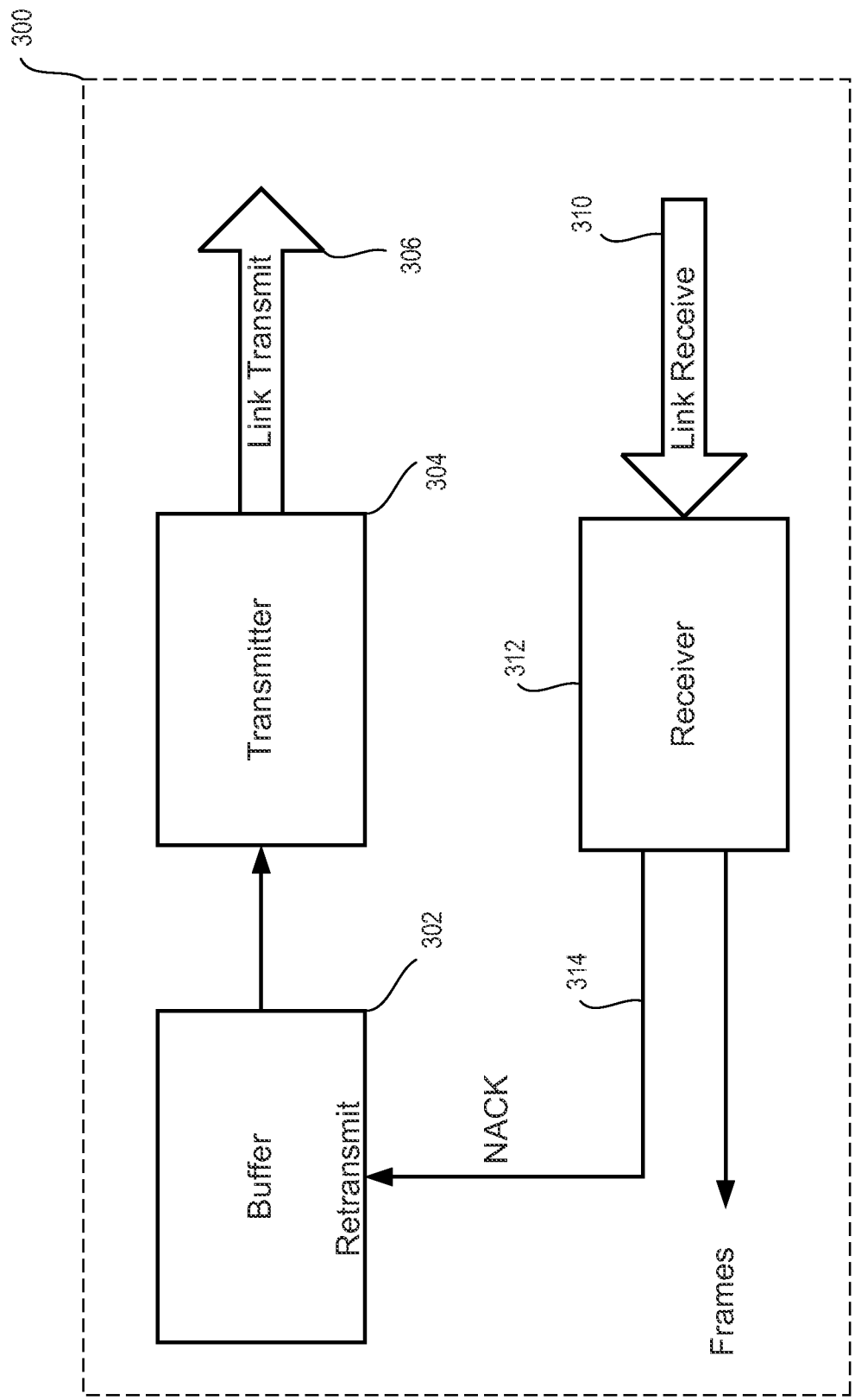
FIG. 3 is a simplified block diagram of a controller with an aging retry buffer with an in-band NACK.

Referring to FIG. 3, a simplified block diagram of a controller 300 is illustrated. In this embodiment, a bidirectional link can comprise a send channel and a receive channel. To avoid the addition of specialized pins for error indication, controller 300 gets error indications ("in band") with frames received from the receive channel of the bidirectional link 306, 310. As shown in FIG. 3, receiver 312 decodes received frames and triggers retransmission from buffer 302 if an error indication 314 (NACK) is received.

Errors might happen rarely, but in a "bursty" fashion, for example because synchronous clock recovery might be lost, invalidating a frame. For this reason, in one embodiment, the recovery from an error includes the termination of the frame, followed by clock re-synchronization before retransmitting the frame. NACK indications are coarse-grained, e.g., there is at most one NACK issued by the receiving controller for each frame that it sends on link 310. Note that the NACK indication is not "precise", e.g., the NACK does not report a precise frame that was received in error, but only that a frame within the last RTT period was in error.

The retry protocol specifies what actions are to be taken when an error has been reported. Note that because the NACK indication is not precise, frames might be retransmitted that have already been properly received, before the one that was erroneously received is re-sent. For that reason, the frames can contain a "sequence" number that increments from frame to frame and allows the receiving controller to discard frames unnecessarily resent. The sequence numbering can also be used for error detection since the sequence numbers increment from frame to frame. If sequences do not follow the incrementing policy outside of retransmit periods then an error has occurred.

The protocol described above makes pessimistic assumptions about erroneous frames, e.g., it assumes that after the first error in a frame, the rest of the frame should be completely discarded. This also implies discarding a possible NACK that could be transmitted with the remainder of an erroneously received frame. However, contrary to frames, NACKs are not retransmitted. To avoid falsely ignoring a potential NACK after an error the controller pessimistically assumes that an erroneously received frame always indicated a NACK.

Figure 4:
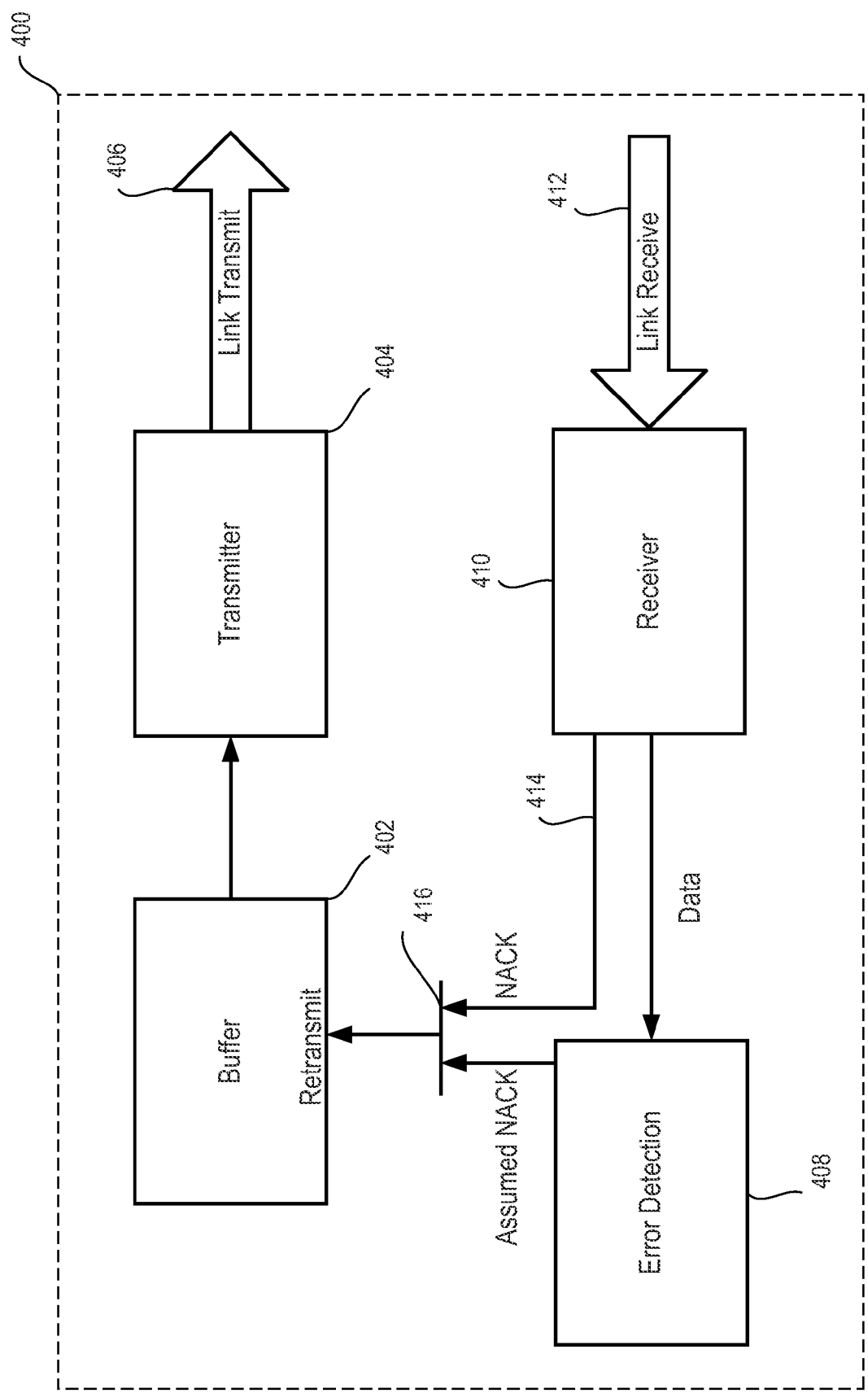
FIG. 4 is a simplified block diagram of an aging retry buffer with an in-band NACK and pessimistic assumption of NACK in erroneously received frames.

FIG. 4 is a simplified block diagram of an aging retry buffer 402 with an in-band NACK 414 and pessimistic assumption of NACK in erroneously received frames. As illustrated in FIG. 4, controller 400 (controller "A") performs error detection 408 on received frames. Either an error detected in a received frame or a received NACK 414 triggers retransmission of the frame from buffer 402. Such pessimism has the consequence that retransmits are initiated on both channels of the link 406, 412, even if an error happened only in one direction. After a transmission error occurred from controller A to controller B (not shown), controller B detects the error and provides an explicit NACK to controller A, but also assumes that its discarded erroneous frame included a NACK from controller A. When controller A receives the explicit NACK, it retransmits the frames that it sent to controller B during the last RTT. Because controller B assumed a NACK from controller A in the erroneous frame, controller B also retransmits the frames that it had sent to controller A during the last RTT. Controller B does not know if controller A had actually detected an error, but retransmitting the frames does not hurt, even if no error was detected, and corrects the error if one had occurred.

Retry buffer 402 of controller A stores frames sent to controller B for potential retransmission as long as may be necessary in any mode of potential delay for an error in the transmitted frame to be detected by the controller B, followed by the NACK indication 414 from controller B reaching controller A. The duration of this sequence is the worst case NACK RTT.

Many embodiments are powered by small batteries and therefore sensitive to power consumption. When no communication is required between the chips, each channel of the link logic and drivers can be put into a quiescent power saving mode. The process of changing a channel of the link from power saving mode to active mode is time consuming. It requires a resynchronization of clocks in an embodiment that uses a serializer-deserializer (SERDES) PHY. This adds significant latency when a first access is requested on a channel of the link that is in a power saving mode. In such case, the worst case RTT is very long since both the send channel of the link and the receive channel of the link, on which a NACK might be provided, may be in power saving mode. The worst case RTT is approximately equal to the sum of the time to transition from power saving mode to active mode on the transmit channel of the link, time to transmit the frame across the transmit channel of the link, the time to perform error detection in the receiving controller, the time to transition from power saving mode to active mode on the receive channel of the link, and the time to provide a NACK from the receiving controller back to the sending controller through the receive channel of its link. To avoid limiting the available bandwidth, the buffer should be large enough for the number of frames that could be sent during the worst case RTT. The latency for clock synchronization for a request frame to wake the send channel of the link and the response frame to wake the receive channel of the link leads to a worst case RTT counted in hundreds of nanoseconds (ns). This leads to a buffer sizes that could exceed 100k gates.

In one embodiment, to avoid requiring a large buffer, the controller supports only a short RTT. As a result, the controller refrains from transmitting any frame until the receive channel of the link is in active mode, providing such a short delay. Such a protocol, however, has a major drawback. It delays the transmission of the initial frame by nearly twice the clock synchronization time, which significantly increases the latency of the initial frame and any sequential frames. Because in such situations the retry buffer is likely to be empty when frame sending is first requested, an improved embodiment allows the sending controller to store frames in the retry buffer for a variable amount of time. The controller monitors the state of the receive channel of the link, and schedules the time before discarding frames from the retry buffer for when a NACK indication can no longer be received for these frames based on the receive link state. This allows the sending controller to transmit at least as many frames as the retry buffer holds, until the receive channel of the link is in active mode. This way latency of an initial burst of frames is minimal while the retry buffer size need only be large enough for active mode operation.

The initial transmitted frame then proceeds to its destination in the receiving device. If, for example, it contains a request to DRAM then by the time that its corresponding response frame comes from DRAM and is made available to the receiving controller for transmission in the reverse direction, the receive channel of the link, in most instances, will already be in active mode. Thereby, the only impact to the latency of the transaction, due to both directions being in power saving mode, is the time to wake up the transmit channel of the link from power saving mode.

In one embodiment, this smart controller requires that each frame in the retry buffer have an associated timestamp set at the time of the frame transmission. The timestamp can be continuously compared to a local clock, the progress of the clock being a function of the state of receive channel of the link. The age of an entry in the retry buffer is the difference between the clock and its timestamp. When that age exceeds a certain threshold (e.g., determined by the RTT) the frame is discarded from the retry buffer. Accordingly, the threshold may vary dynamically based on the link state.

Figure 5:
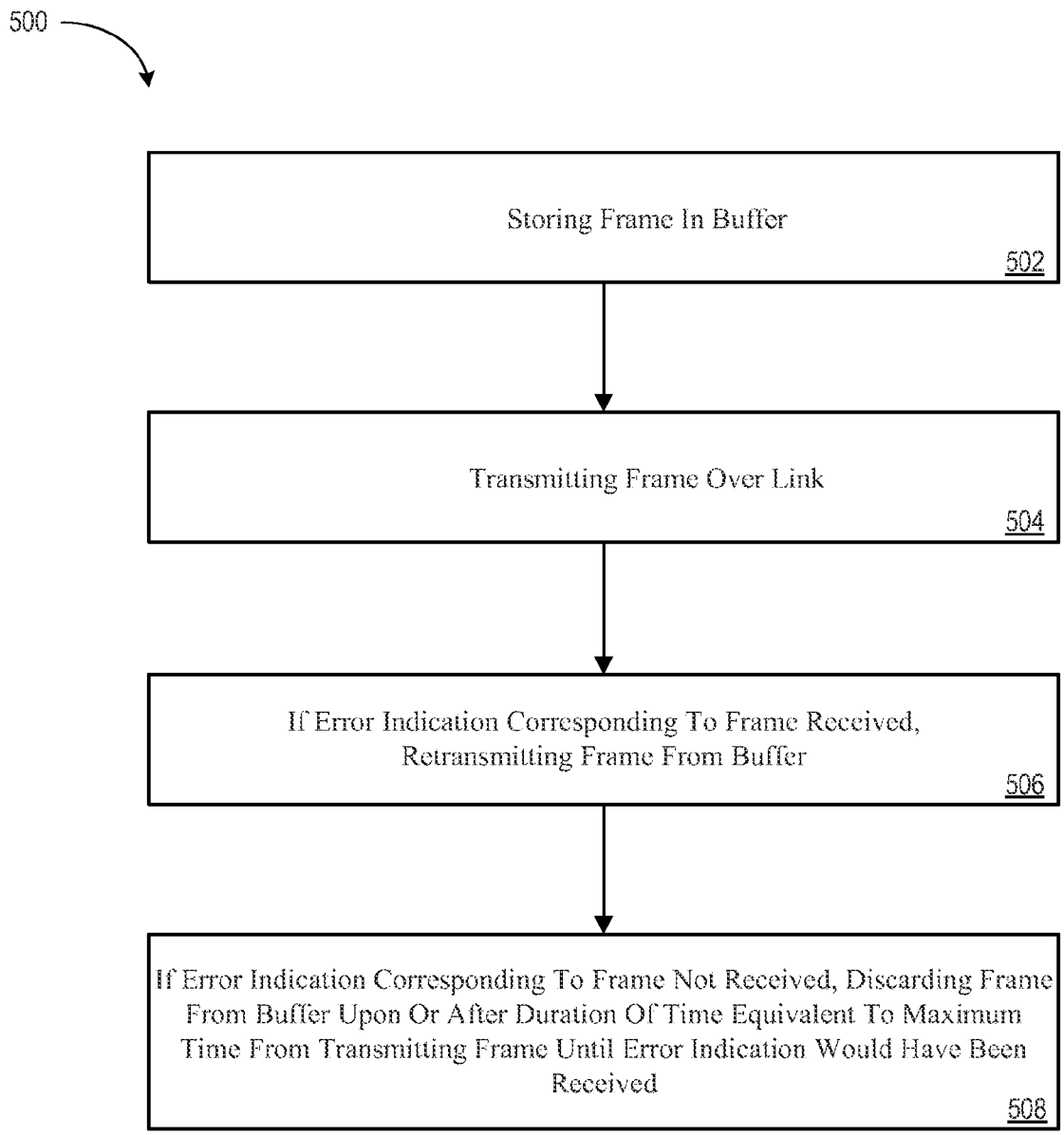
FIG. 5 is an exemplary process of reliably sending a frame of a data on a link.

FIG. 5 is an exemplary process 500 of reliably sending a frame of a data on a link from a sending controller to a receiving controller over a link. In some implementations, process 500 can begin by storing a received frame in a buffer of the sending controller (502). The frame is transmitted over a link to the receiving controller (504). If an error indication is received by the sending controller, the frame is retransmitted from the buffer of the sending controller to the receiving controller (506). If an error indication is not received by the sending controller, the frame is discarded from the buffer upon or after a duration of time equivalent to the maximum time from transmitting the frame until the error indication would have been received by the sending controller (508).

In some implementations, the link is bidirectional and the error indication is received from the bidirectional link. In some implementations, error detection is performed on frames from the bidirectional link, and one or more frames from the buffer are retransmitted to the receiving controller if an error is detected in a received frame.

In some implementations, the frame is discarded from the buffer of the sending controller upon or after a duration of time that is determined by the state of the link. The duration of time corresponding to a state of the link can be the time from transmitting the frame until the error indication would have been received if an error is detected in the frame on the link in the state. The buffer can store fewer than the number of frames that could be sent in the maximum time from transmitting a frame until receiving a corresponding error indication if an error indication would have been received. The link can be in a power saving state.

What is claimed is:

1. A method of sending a frame of data on a link, comprising:
    storing the frame in a buffer coupled to a transmitter;
    transmitting, by the transmitter, the frame over the link;
    in response to receiving an input indicating that an error has occurred in the transmission of the frame, retransmitting the frame from the buffer;
    monitoring a state of a receive channel of the link;
    in response to not receiving the input upon or after a maximum round trip duration between a time of the transmission and a time the input would be received, discarding the frame from the buffer, wherein discarding the frame comprises:
    scheduling a time before discarding the frame when the input can no longer be received for these frames based on the state of the receive channel.

2. The method of claim 1, wherein the link is a bidirectional link and the input is received from the bidirectional link.

3. The method of claim 2, further comprising:
    performing error detection on a frame received from the bidirectional link; and
    retransmitting at least the frame from the buffer if an error is detected in the received frame.

4. The method of claim 1, where the duration of time corresponding to the state of the link is the maximum round trip duration.

5. The method of claim 1, wherein the buffer stores fewer than a number of frames that could be sent in the maximum round trip duration.

6. The method of claim 1 wherein the link can be in a power saving state.

7. A controller for sending frames of data on a link, comprising:
    a buffer, coupled to a transmitter, configured for storing one or more frames;
    an input device configured to receive an indication of whether an error has occurred; and
    wherein the transmitter is configured for transmitting a frame of the one or more frames and, responsive to the input device receiving the indication indicating that the error has occurred, configured for retransmitting the frame from the buffer, and, responsive to the input device not receiving the indication upon or after a maximum round trip duration between a time of the transmission and a time the input would be received, configured for discarding the frame from the buffer; and wherein the controller monitors a state of a receive channel of the link and schedules a time before discarding the frame when the input can no longer be received for these frames based on the state of the receive channel.

8. The controller of claim 7, further comprising a receiver, and wherein the link is a bidirectional link coupled to the receiver.

9. The controller of claim 8, further comprising:
    an error detection unit that accepts a frame received from the bidirectional link and triggers a retransmit of the one or more frames from the buffer upon the indication that an error is detected in the received frame.

10. The controller of claim 8, wherein a size of the buffer is less than a number of frames that could be sent in the maximum round trip duration.

11. The controller of claim 8, wherein the link can be in a power saving state.

* * * * *